(12) United States Patent
Ranjan et al.

(10) Patent No.: US 11,387,725 B2
(45) Date of Patent: Jul. 12, 2022

(54) INTEGRATED HEAT DISSIPATIVE STRUCTURE FOR ELECTRIC MACHINE

(71) Applicant: Hamilton Sundstrand Corporation, Charlotte, NC (US)

(72) Inventors: Ram Ranjan, Glastonbury, CT (US); Andrzej Ernest Kuczek, Bristol, CT (US); Jagadeesh Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 309 days.

(21) Appl. No.: 14/722,347

(22) Filed: May 27, 2015

(65) Prior Publication Data

US 2016/0352201 A1 Dec. 1, 2016

(51) Int. Cl.
*H02K 17/16* (2006.01)
*H02K 9/06* (2006.01)
*H02K 1/20* (2006.01)

(52) U.S. Cl.
CPC ............. *H02K 17/165* (2013.01); *H02K 9/06* (2013.01); *H02K 1/20* (2013.01)

(58) Field of Classification Search
CPC ........ H02K 9/06; H02K 17/16; H02K 17/165; H02K 1/20; H02K 1/28; H02K 1/30; H02K 15/0012; H02K 15/18; H02K 15/185; H02K 3/24; H02K 9/005
USPC ... 310/62, 63, 60 R, 52, 125, 211, 212, 260, 310/156.78–156.84
See application file for complete search history.

(56) References Cited

U.S. PATENT DOCUMENTS

| | | | | |
|---|---|---|---|---|
| 382,279 | A | * 5/1888 | Tesla | H02P 21/141 318/727 |
| 2,012,021 | A | * 8/1935 | Petersen | B22D 19/0054 164/94 |
| 3,194,165 | A | * 7/1965 | Sörlin | F04D 13/0646 417/353 |
| 3,597,645 | A | 8/1971 | Duffert | |
| 3,612,925 | A | * 10/1971 | Swanke | H02K 17/165 310/211 |
| 5,925,960 | A | * 7/1999 | Hayes | H02K 9/06 29/889.3 |
| 8,492,952 | B2 | 7/2013 | Bradfield | |

(Continued)

FOREIGN PATENT DOCUMENTS

| | | | | |
|---|---|---|---|---|
| DE | 102009012852 A1 | * 9/2010 | ......... | H02K 15/0012 |
| DE | WO 2014072263 A2 | * 5/2014 | ............... | H02K 1/32 |

(Continued)

OTHER PUBLICATIONS

WO 2014072263 A2 (English Translation).*
JP 55153255 A (Englsih Translation).*
DE-102009012852-A1 (English Translation) (Year: 2010).*

*Primary Examiner* — Quyen P Leung
*Assistant Examiner* — Alexander Moraza
(74) *Attorney, Agent, or Firm* — Cantor Colburn LLP

(57) ABSTRACT

An electrical machine is provided including a stator assembly having a stator core and a plurality of windings. A rotor assembly is arranged concentrically with the stator assembly and is configured to rotate about an axis. The rotor assembly includes a rotor core and a cage surrounding a periphery of the rotor core. The cage includes a plurality of impeller fins positioned adjacent at least one end of the rotor core.

11 Claims, 7 Drawing Sheets

(56) References Cited

U.S. PATENT DOCUMENTS

| | | | | |
|---|---|---|---|---|
| 2004/0084974 A1* | 5/2004 | Nelson | ............... | H02K 9/06 |
| | | | | 310/58 |
| 2004/0155539 A1* | 8/2004 | Potoradi | ............ | H02K 9/20 |
| | | | | 310/58 |
| 2008/0150400 A1* | 6/2008 | Crowell | ............. | H02K 9/06 |
| | | | | 310/60 R |
| 2008/0179982 A1* | 7/2008 | Kramer | ............ | H02K 1/145 |
| | | | | 310/168 |
| 2013/0285485 A1* | 10/2013 | Song | .............. | H02K 1/20 |
| | | | | 310/53 |
| 2014/0246933 A1* | 9/2014 | Chamberlin | ........ | H02K 9/19 |
| | | | | 310/54 |
| 2014/0361649 A1* | 12/2014 | Chong | ............ | H02K 1/20 |
| | | | | 310/54 |
| 2016/0281734 A1* | 9/2016 | Musgrave | ......... | F04D 25/024 |
| 2016/0348517 A1* | 12/2016 | Kenyon | ............ | F01D 5/34 |

FOREIGN PATENT DOCUMENTS

| | | | | |
|---|---|---|---|---|
| GB | 863921 A | * | 3/1961 | ............ H02K 3/22 |
| GB | 2314692 A | | 1/1998 | |
| JP | 55153255 A | * | 11/1980 | ............ H02K 9/20 |
| JP | 0649211 A2 | * | 4/1995 | ......... B22D 19/0054 |

\* cited by examiner

INTEGRATED HEAT DISSIPATIVE STRUCTURE FOR ELECTRIC MACHINE

BACKGROUND

Exemplary embodiments of this invention generally relate to electrical machines and, more particularly, to a structure of an electrical machine for improved cooling.

Conventional electrical machines lack sufficient power density for various applications due to limited heat transfer ability. The power density of electric machines may be improved from their current state-of-the-art through the use of better thermal management techniques, which includes denser packing of coils and efficient heat removal enabling electrical machines to operate at much higher current densities. Improvements in heat dissipation would maintain a low coil temperature, reduce winding losses, and the thermo-mechanical stresses, thus ensuring high reliability of the electric machine. Similar improvements can be achieved for other class of electrical machines.

SUMMARY

According to one embodiment of the invention, an electrical machine is provided including a stator assembly having a stator core and a plurality of windings. A rotor assembly is arranged concentrically with the stator assembly and is configured to rotate about an axis. The rotor assembly includes a rotor core and a cage surrounding a periphery of the rotor core. The cage includes a plurality of impeller fins positioned adjacent at least one end of the rotor core.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
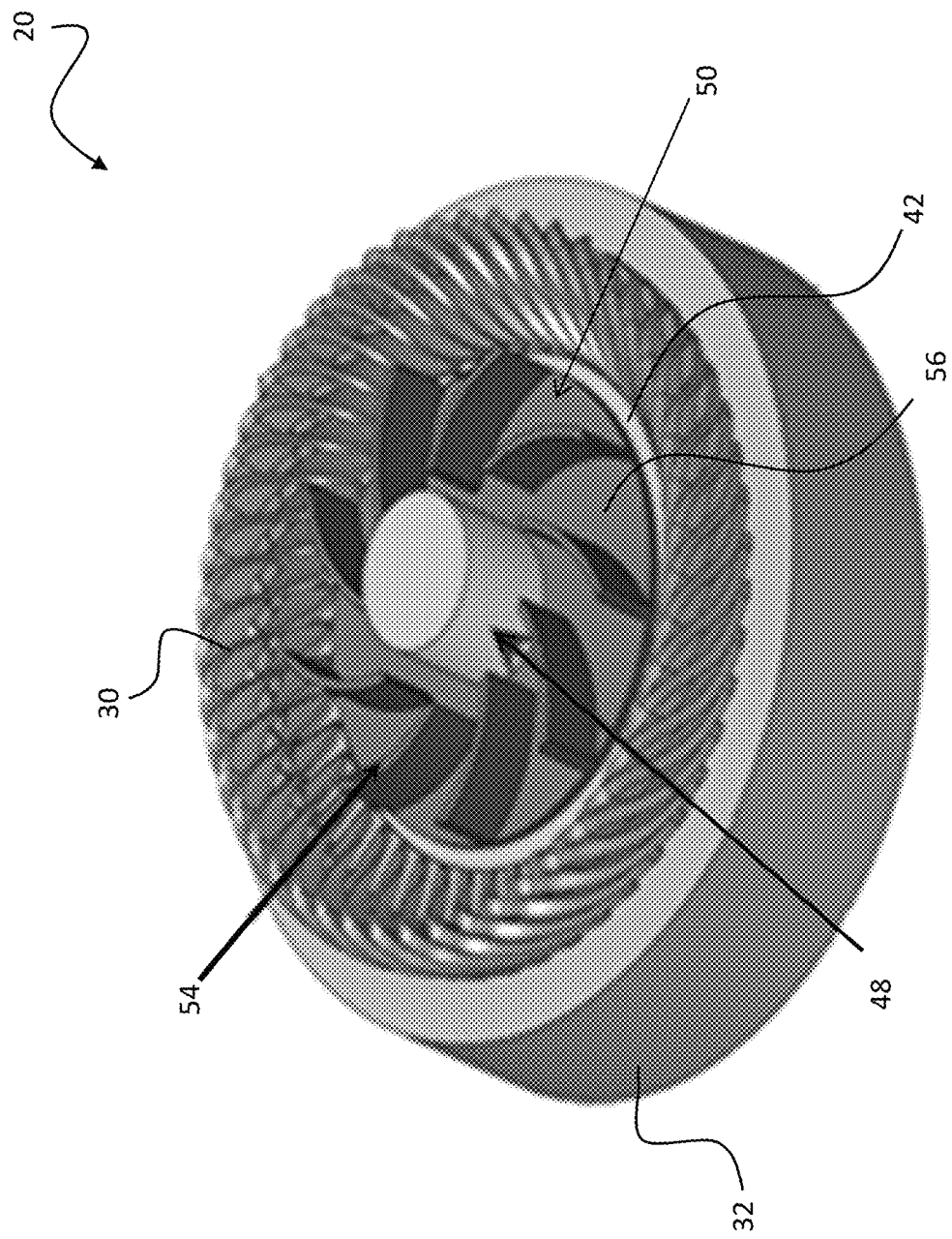
FIG. 1 is a perspective view of an electric motor according to an embodiment of the present disclosure.

The detailed description explains embodiments of the present disclosure, together with advantages and features, by way of example with reference to the drawings.

DETAILED DESCRIPTION

Referring now to the FIGS., an example of an electromechanical machine 20 configured to convert mechanical energy into electrical energy, such as a generator or induction motor for example, is illustrated in more detail. The machine 20 generally includes a stator assembly 30 and a rotor assembly 40 positioned concentrically relative to the stator assembly 30, for example within a hollow interior of the stator assembly 30. In the illustrated, non-limiting embodiment, the stator assembly 30 includes a stator core 32 having a plurality of teeth 34 extending radially inwardly therefrom. A plurality of stator windings 36 are positioned between the plurality of teeth 34 and in some instances may be wound about each of the plurality of teeth 34. As shown in the FIGS., in one embodiment, the plurality of windings 36 are formed as a separate component configured to slidably insert between the teeth 34 of the stator core 32.

Figure 7:
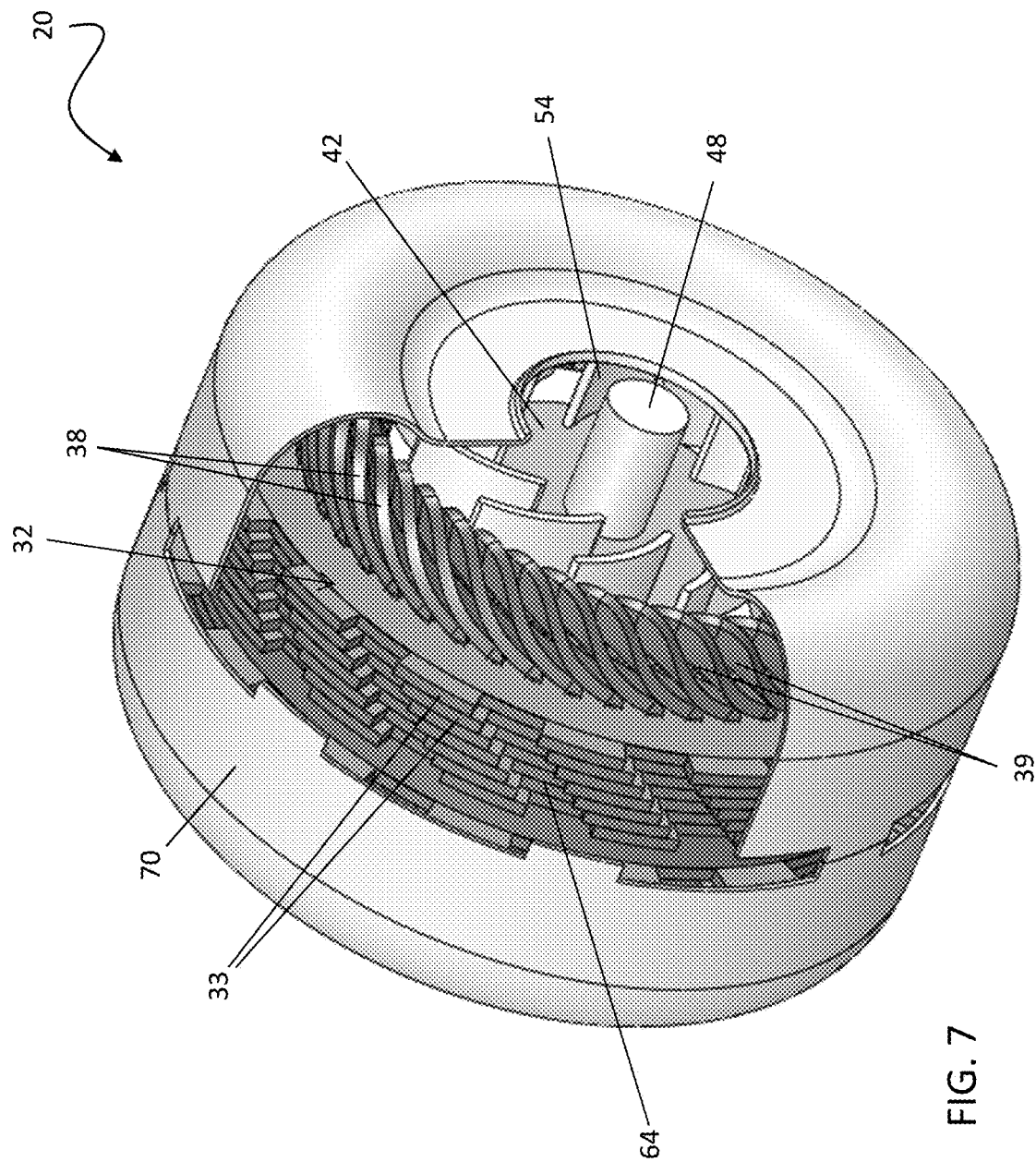
FIG. 7 is a partially sectioned perspective view of an electric motor according to an embodiment of the present disclosure.

The stator core 32 may, but need not be formed from a plurality of stacked, sheet metal laminations 33 (see FIG. 7). As is understood by a person having ordinary skill in the art, the actual number of laminations 33 included in the core 32 will vary depending on the application of the machine 20.

The rotor assembly 40 is positioned within the stator assembly 30. The rotor assembly 40 includes a rotor core 42 having a plurality of teeth 44 and a central opening 46 configured to receive a rotor shaft 48 that drives the rotor assembly 40 about an axis of rotation X. Similar to the stator core 32, the rotor core 42 may be formed from a plurality of stacked, sheet metal laminations. When installed in a given application, such as a motorized vehicle for example, the stator windings 36 may receive or generate power.

Figure 2:
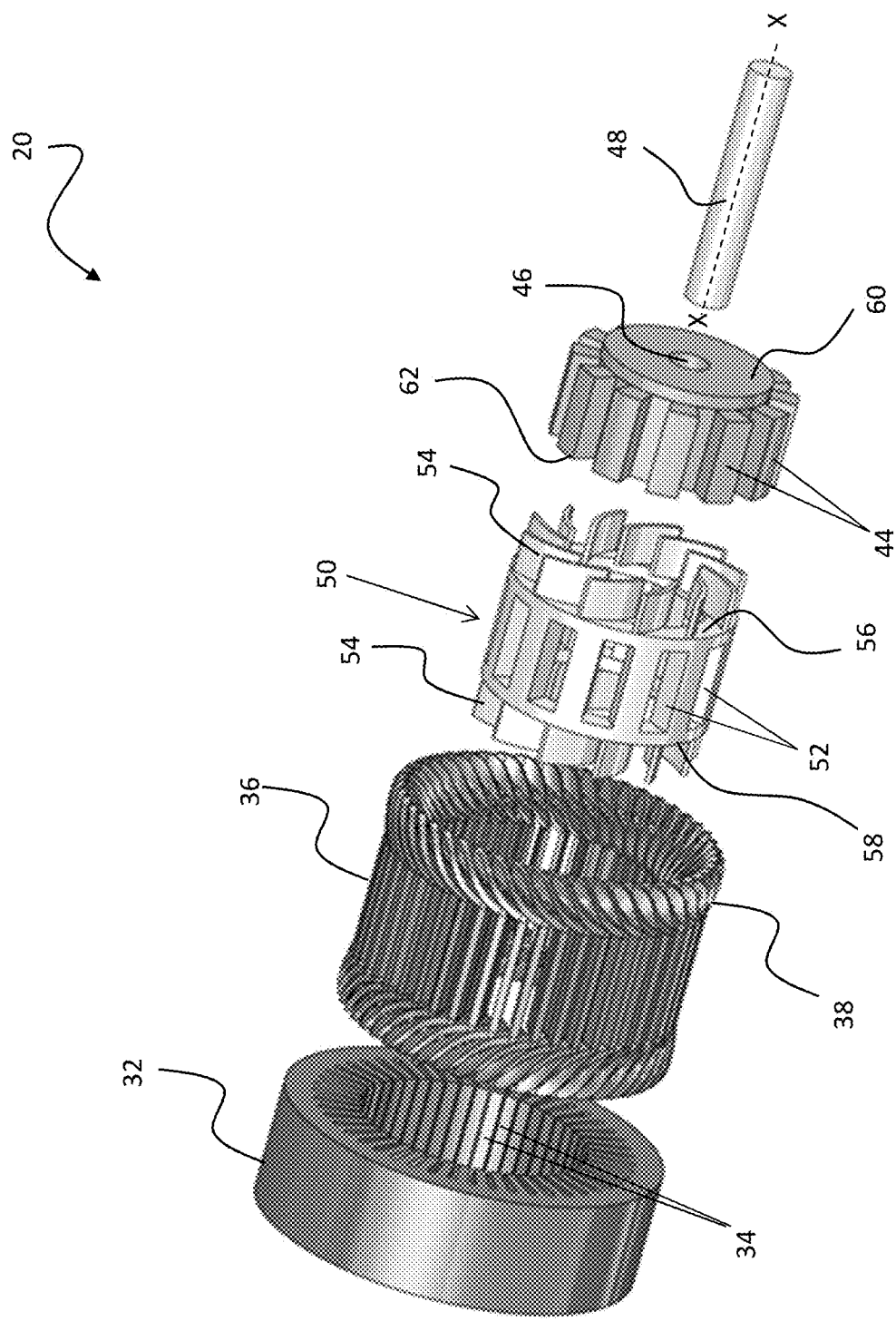
FIG. 2 is an exploded view of the electric motor of FIG. 1 according to an embodiment of the present disclosure.
Figure 3:
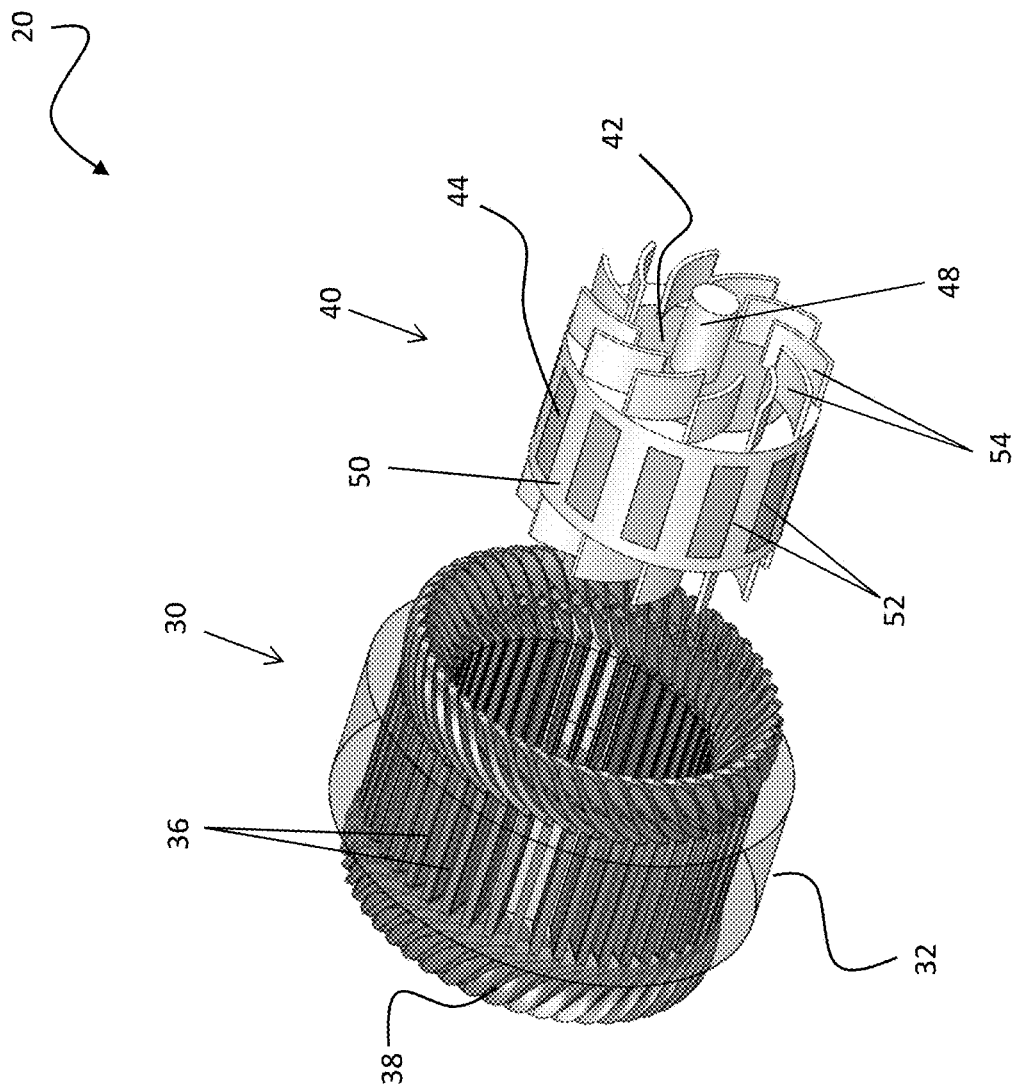
FIG. 3 is a partially exploded view of the electric motor of FIG. 1 according to an embodiment of the present disclosure.

The electrical machine 20 illustrated and described herein has one or more features configured to improve heat dissipation of the machine 20 compared to conventional electrical machines. In one embodiment, as is illustrated more clearly in FIGS. 2 and 3, the rotor assembly 40 additionally includes a hollow casing or cage 50 configured to surround and rotate in unison with the rotor core 42. The cage 50 includes a plurality of openings 52 spaced about the circumference and configured to align with the plurality of teeth 44 of the rotor core 42 once installed thereon.

Figure 4:
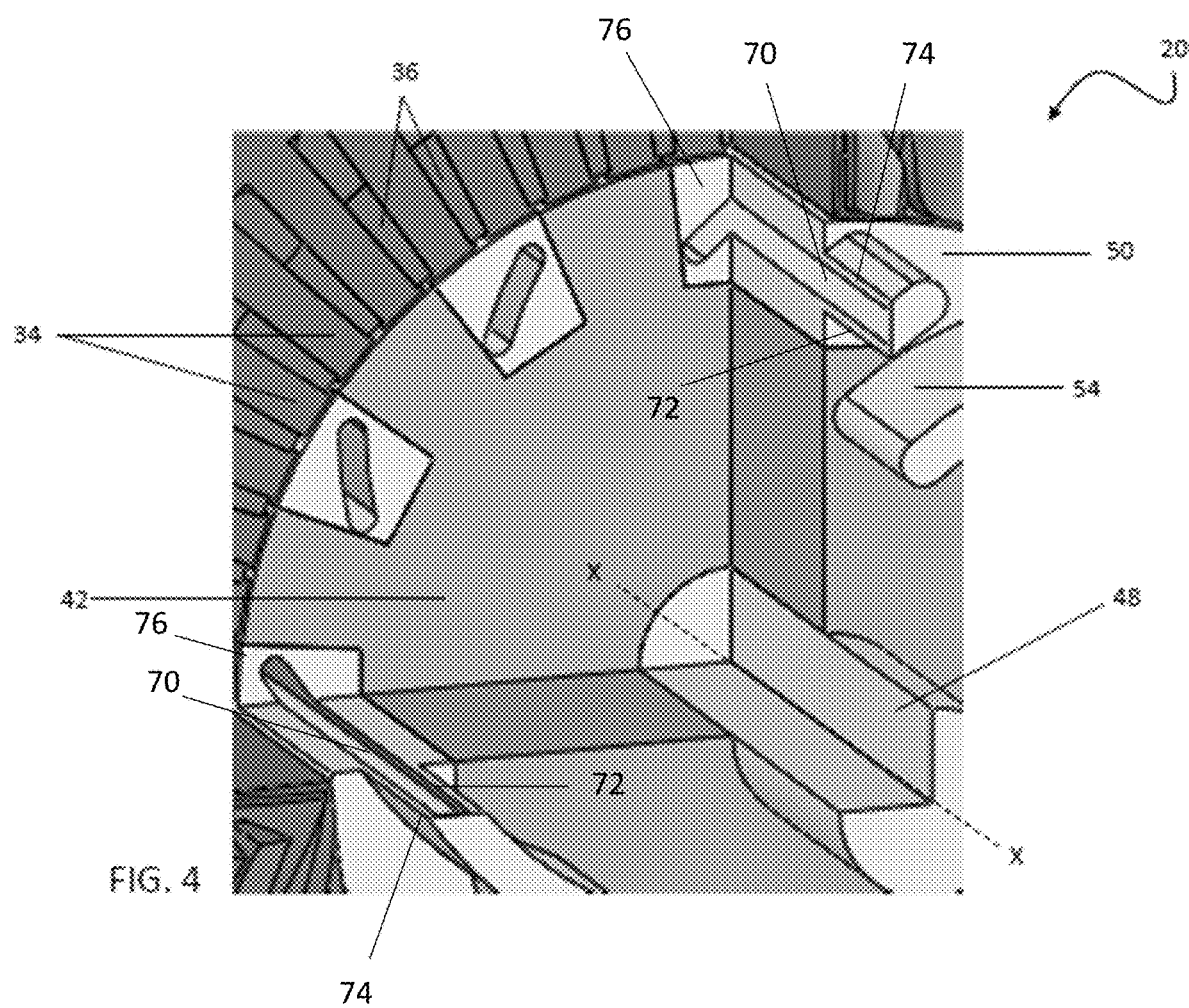
FIG. 4 is a partially sectioned perspective view of an electric motor rotor with heat pipes according to an embodiment of the present disclosure.
Figure 5:
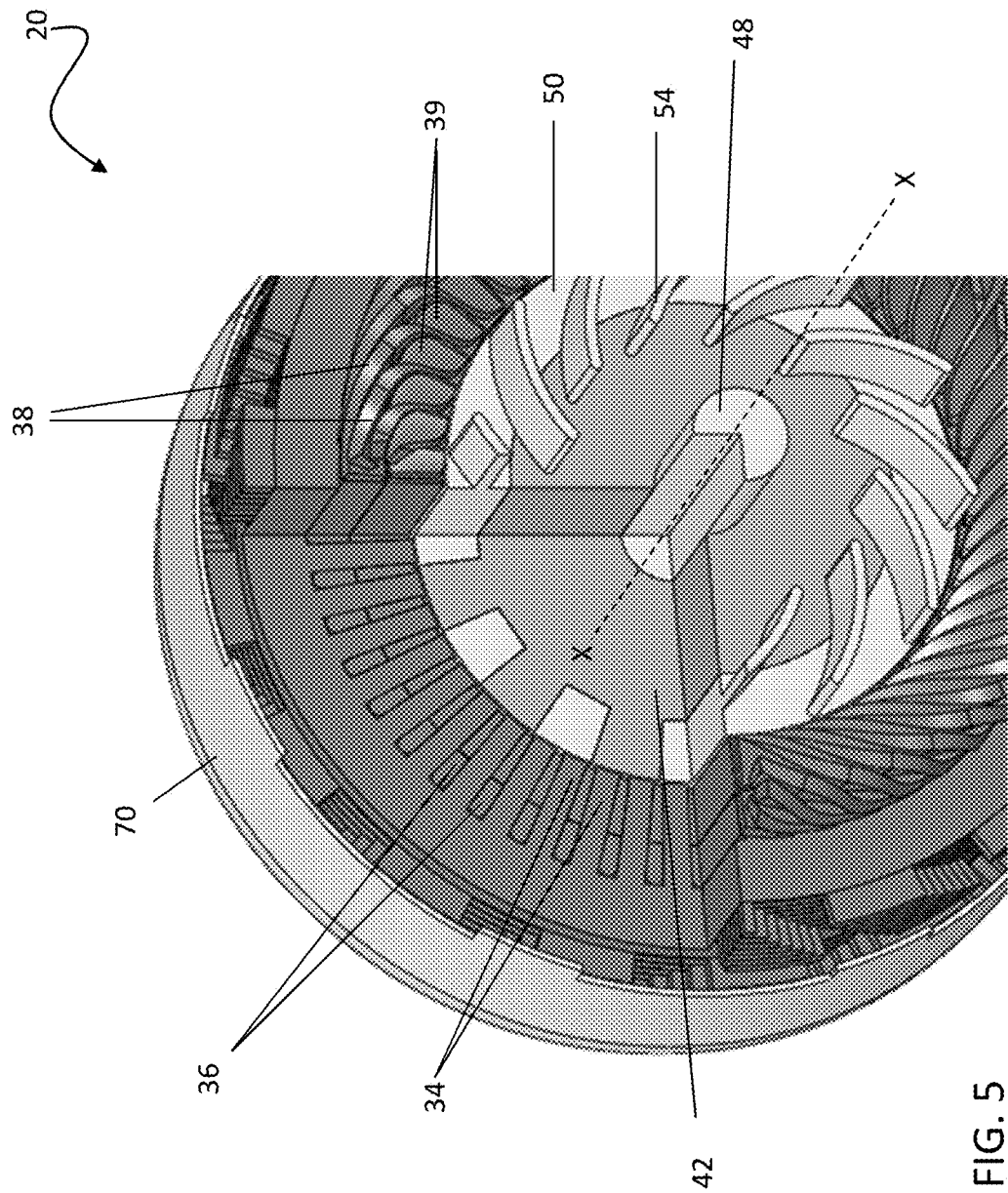
FIG. 5 is a partially sectioned perspective view of an electric motor rotor without heat pipes according to another embodiment of the present disclosure.

One or more impeller fins 54 may extend from at least one of the opposing ends 56, 58 of the cage 50. As a result, the impeller fins 54 are generally positioned adjacent to the ends of the rotor core 42, stator core 32, and the end turns 38 of the windings 36. Although the impeller fins 54 are illustrated as having a generally curved configuration, other configurations are within the scope of the present disclosure. The cage 50 and impeller fins 54 are generally formed from a metal material and may have a solid configuration, as shown in FIG. 5, or a hollow configuration, as shown in FIG. 4. The cage includes a plurality of cage arms 76 with the openings 52 defined between adjacent cage arms 76 of the plurality of cage arms 76. In the embodiment of FIG. 4, the impeller fins 54 include a fin cavity 70, defined as a hollow portion of the impeller fin 54, defined between a radially inner wall 72 and a radially outer wall 74 of the impeller fin 54. The cage 50 and impeller fins 54 may be formed together, such as through an additive manufacturing process for example. In embodiments where the cage 50 and fins 54 have a generally hollow configuration, heat pipes (not shown) may extend between the cage 50 and the impeller fins 54 to draw heat from the interior of the rotor core 42 towards the cooled ends 56, 58. As a result of the rotation of the rotor assembly 40, the impeller fins 54 not only enhance cooling of the adjacent ends 60, 62 of the rotor core 42, but also provide a cooling air flow to the stator end regions.

In embodiments where the plurality of windings 36 disposed within the stator core 32 are formed from a solid wire, a portion of the plurality of windings 36, such as the end turns 38 exposed at the sides of the stator core 32 for example, may be formed as fins with openings or slots 39 disposed there between. These slots 39 are configured to allow a fluid flow, such as cool air for example, there through. In one embodiment, these slots 39 are formed by shaping the wire windings 36 to form a plurality of N-turns. Alternatively, to decrease the copper winding thermal resistance, additional thermal performance can be enabled by forming at least a portion of the plurality of windings 36 from a hollow wire integrated with one or more heat pipes (not shown). The heat pipes are configured to move heat from the interior of the stator core 32 towards the exposed ends of the thereof, which may be particularly advantageous in machines having an extended axial length.

Figure 6:
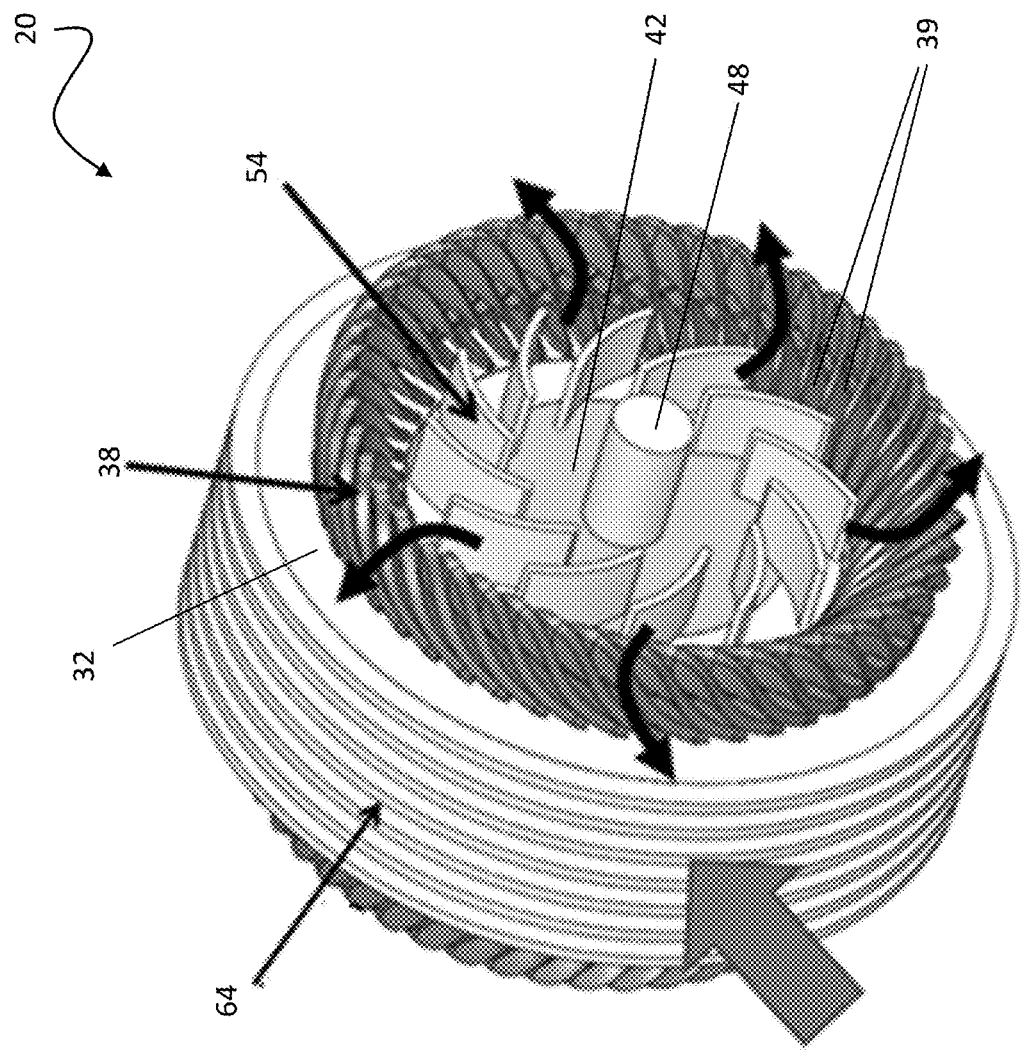
FIG. 6 is a perspective view of an electric motor according to an embodiment of the present disclosure.

In one embodiment, as shown in FIG. 6, one or more flow channels 64 configured to receive a coolant flow are arranged about the outer diameter of the stator core 32. These flow channels 64 may be formed by positioning a jacket or sleeve having the plurality to flow channels 64 formed therein about the outer diameter of the stator core 32. In another embodiment, the flow channels 64 may be integrally formed with the outer diameter of the stator core 32, for example machining, by offsetting adjacent laminations 33 (see FIG. 7), or alternatively, by including laminations 33 having a plurality of varying sizes in the stator core 32. In the illustrated, non-limiting embodiment of FIG. 6, the flow channels 64 extend circumferentially about the stator core 32. However, flow channels 64 having another configuration, for example axial or transverse flow channels (FIG. 7), are within the scope of the present disclosure.

As shown in FIG. 6, the plurality of flow channels 64 formed may be open to the atmosphere. In such embodiments, a fluid, for example air, may be directed through the plurality of flow channels 64 about the exterior of the stator assembly 30. In other embodiments, the stator assembly 30 may be enclosed by a casing 70 or a fluid plenum having one or more flow inlets and outlets. In such embodiments, the fluid provided about the exterior of the stator assembly 30 may be air, or alternatively, may be a liquid, such as water for example. The fluid flow through the plurality of flow channels 64 may be driven by an external pump.

In operation, rotation of the rotor shaft 48 and therefore the rotor assembly 40 is configured to cause a cooling fluid to move about the machine 20. The impeller fins 54 on the ends of the cage 50 transfer heat from an interior part of the rotor core 42 to the passing fluid. From the fins 54, the cooling fluid flows through the exposed end turns 38 of the stator windings 36. The end turns 38 also transfer heat from the inside of the stator core 32 and windings 36 to the passing fluid. The cooling fluid then may also move through the flow channels 64 arranged at the outer diameter of the stator core 32 where it further absorbs heat transmitted from the interior to the exterior surface of the core 32.

A machine 20 as described herein has an improved power density by enabling higher heat dissipation. The weight of the components required to adequately cool the machine 20 may be reduced by integrating one or more of the described heat dissipation features into the machine 20 itself. In addition, by integrating one or more features configured to improve the heat dissipation of the machine, the overall cost of the machine 20 may be reduced.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. An electrical machine comprising:
a stator assembly including a stator core and a plurality of windings;
a rotor assembly arranged concentrically with the stator assembly and configured to rotate about an axis, the rotor assembly including a rotor core and a hollow cage surrounding a periphery of the rotor core, wherein the cage includes a plurality of impeller fins extending from a first axial end of the rotor core and extending from a second axial end of the rotor core opposite the first axial end, at least one impeller fin of the plurality of impeller fins including an enclosed hollow portion, the hollow portion extending axially from the first axial end of the rotor core and protruding axially from an axial end of the cage opposite the first axial end of the rotor core, the plurality of impeller fins formed integral with the cage via additive manufacturing, the hollow cage and the hollow portion of the at least one impeller fin defining a heat pipe extending between the hollow cage and the at least one impeller fin;
the cage including a plurality of cage arms extending axially between a first cage end and a second cage end, the plurality of cage arms defining one or more openings therebetween, each opening being complimentary to and aligned with a tooth of the rotor core, the cage arms each including a cage hollow portion aligned with the hollow portion of the at least one impeller fin;
wherein at least one flow channel is formed in the stator assembly and extends circumferentially about an exterior surface of the stator core.

2. The electrical machine according to claim 1, wherein the plurality of impeller fins has a generally curved configuration.

3. The electrical machine according to claim 2, wherein the impeller fins are configured to direct axial air flow in a radial direction.

4. The electrical machine according to claim 1, wherein the plurality of impeller fins has a generally straight configuration.

5. The electrical machine according to claim 1, wherein the at least one flow channel is not parallel to the axis.

6. The electrical machine according to claim 1, wherein the at least one flow channel is formed in a jacket arranged about the stator core.

7. The electrical machine according to claim 1, wherein the at least one flow channel is integrally formed with the stator core.

8. The electrical machine according to claim 1, wherein the stator core includes a plurality of stacked stator laminations, the at least one flow channel being formed by varying a circumferential position of adjacent stator laminations.

9. The electrical machine according to claim 1, wherein the at least one flow channel of the stator core is open to the atmosphere.

10. The electrical machine according to claim 1, wherein the stator assembly is enclosed within a casing.

11. The electrical machine according to claim 1, wherein one or more end turns of the plurality of windings are formed as fins separated from one another by a distance.

\* \* \* \* \*